Figure 1:
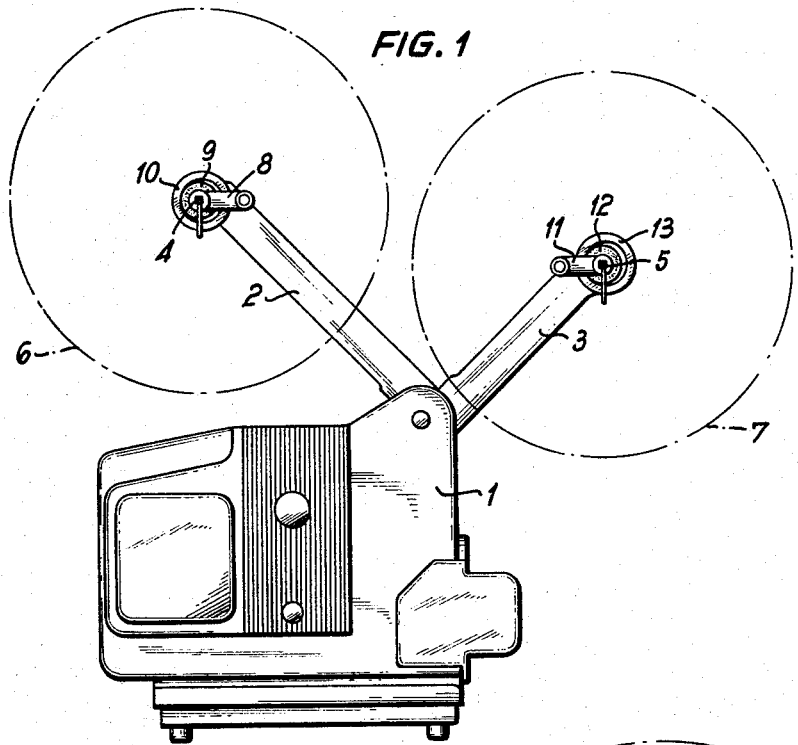

Nov. 22, 1966   H. RUBE   3,286,942
MOTION PICTURE PROJECTOR
Filed Aug. 26, 1964   3 Sheets-Sheet 1

INVENTOR
Helmut Rube
by
Michael J. Striker
Atty.

Nov. 22, 1966   H. RUBE   3,286,942
MOTION PICTURE PROJECTOR
Filed Aug. 26, 1964   3 Sheets-Sheet 3

INVENTOR
Helmut Rube by
Michael J. Striker
Atty

United States Patent Office 3,286,942
Patented Nov. 22, 1966

3,286,942
MOTION PICTURE PROJECTOR
Helmut Rube, Endersbach, Germany, assignor to Eugen Bauer G.m.b.H., Stuttgart-Unterturkheim, Germany
Filed Aug. 26, 1964, Ser. No. 392,098
Claims priority, application Germany, Aug. 28, 1963, B 73,288
15 Claims. (Cl. 242—55.11)

The present invention relates to motion picture projectors.

In particular, the present invention relates to motion picture projectors which are adapted to operate normally with film spools of a given size but which also are adapted to operate, when required, with film spools of a size larger than the size which is normally used.

Although it is already known to provide motion picture projectors which are capable of accommodating larger than normal film spools, known structures require a relatively large number of relatively heavy and expensive components, and the drives for the take-up spool which is larger than normal size is such that the tension on the film diminishes as the diameter of the film wound on the larger take-up spool increases, so that a very undesirable winding of the film takes place with the known structures.

It is therefore a primary object of the present invention to provide a motion picture projector which is capable of accommodating larger than normal film spools while requiring a relatively small number of relatively light and inexpensive components.

A further object of the present invention is to provide a motion picture projector which when it operates with larger than normal film spools is capable of driving the spools in such a way that the tension on the film does not fall as the diameter of the film wound onto the larger take-up spool increases.

In particular, it is an object of the present invention to provide a transmission for a larger than normal film spool which transmits to the latter spool a drive through friction wheels which will automatically press against each other with a force determined by the weight of the film wound onto the larger take-up spool.

Also, it is an object of the invention to provide a structure of the above type which includes components capable of being quickly and easily attached to a conventional projector when it is required to use film spools of larger than normal size and capable also of being quickly and easily detached from the projector when it is desired to return to the use of film spools of normal size.

With these objects in view, the invention includes, in a motion picture projector, a drive means for driving a first rotary shaft which is adapted to carry a first film spool. A second rotary shaft is provided for carrying a second film spool of a size larger than the first film spool so that more film can be accommodated on the second film spool. The structure of the invention also includes a friction transmission for transmitting a drive from the drive means to the second shaft for rotating the latter, and this friction transmission includes a plurality of friction wheels which press against each other with a force determined by the weight of the film wound onto the take-up spool carried by the second rotary shaft.

Figure 2:
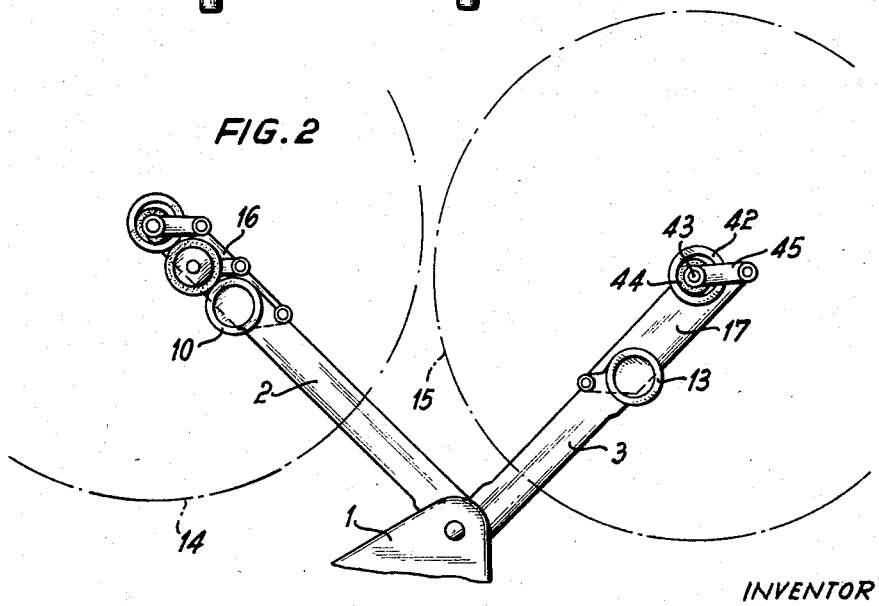
Figure 3:
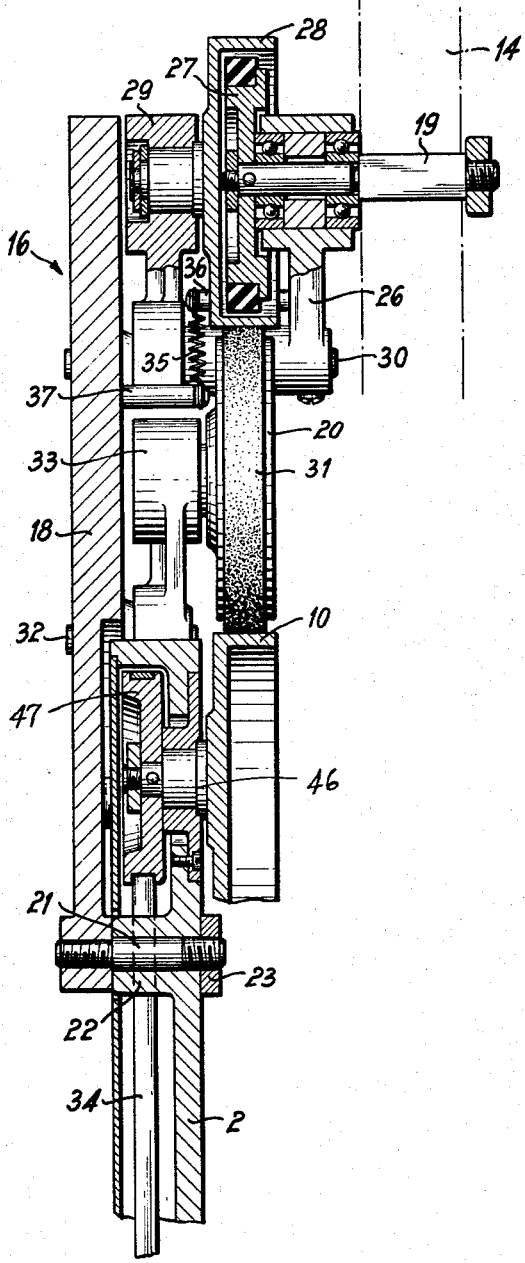
Figure 4:
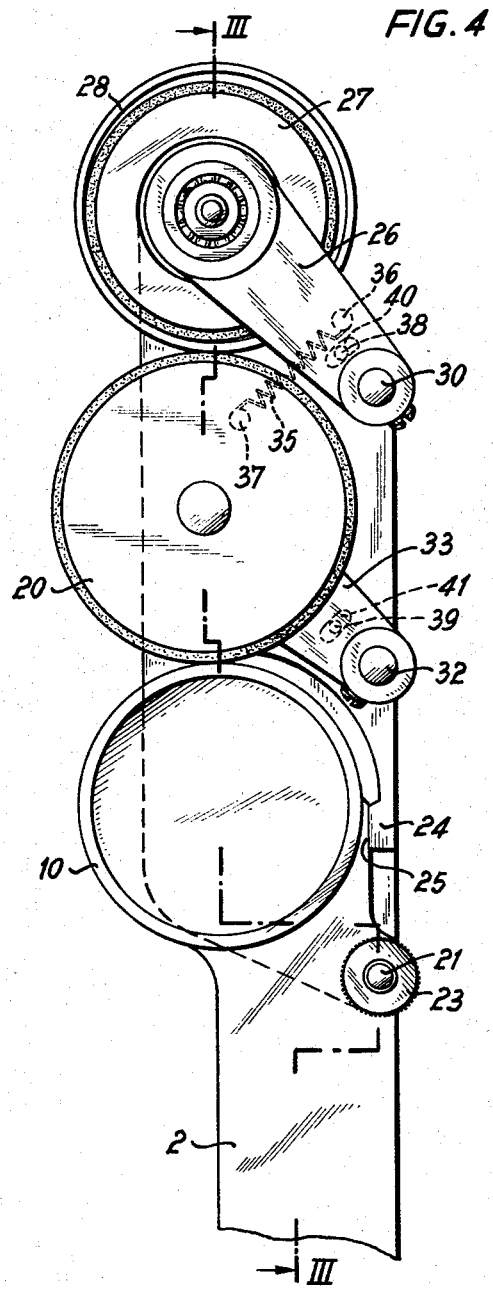

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic side view of a conventional motion picture projector before it has been provided with the structure of the invention for accommodating larger than normal film spools;

FIG. 2 schematically illustrates the spool carrying structure of FIG. 1 provided with the structure of the invention for accommodating larger than normal film spools;

FIG. 3 is a longitudinal sectional illustration showing details of the structure for supporting the larger film spool and transmitting a drive thereto; and FIG. 4 is a side view of the structure of FIG. 3 as seen from the right of FIG. 3.

Referring now to FIG. 1, there is illustrated therein a conventional motion picture projector 1 provided with a pair of arms 2 and 3 which are turnably carried by the housing of the projector 1 and which are adapted to respectively carry the shafts 4 and 5 which in turn are adapted to support the film spools 6 and 7 of normal size, the spool 7 being a supply spool from which film travels through the projector while the spool 6 is a take-up spool onto which the film is wound after having passed through the projector. The shaft 4 which carries the take-up spool 6 is supported for rotary movement by a lever 8 which is turnably carried by the arm 2 and this shaft 4 is fixed with a friction wheel 9 which is surrounded by a rotary friction drum 10 driven in a known way from the drive of the projector 1.

The shaft 5 which carries the supply spool 7 is supported for free rotation by a lever 11 which is turnably carried by the arm 3, and this shaft 5 is fixed with a friction wheel 12 which is surrounded by a friction drum 13 which is fixed to the arm 3, and the angle of the lever 11 is such that the weight of the spool 7 and the film carried thereby urges the periphery of the friction wheel 12 into engagement with the inner periphery of the drum 13 so that elements 12 and 13 act as a brake on the rotation of the spool 7.

In order to enable the projector of FIG. 1 to accommodate spools 14 and 15 of larger than normal size, the arms 2 and 3 have removably connected therewith extensions 16 and 17, respectively, as shown in FIG. 2, and these extensions 16 and 17 are in the form of plates which are removably connected with the arms 2 and 3 after the levers 8 and 11 are respectively removed from the arms 2 and 3.

As may be seen from FIG. 3, the extension 16 includes a plate 18 which forms a support means for the various components carried by the plate 18, these components including a rotary shaft 19 which is adapted to carry the larger take-up spool 14 as well as an intermediate wheel 20. The extension plate 18 is removably connected with the arm 2 by means of a threaded pin 21 which is received in the bearing 22 of the arm 2, this bearing normally receiving the pivot pin which connects the lever 8 to the arm 2. The threaded pin 21 has a knurled nut 23 connected thereto for fixing pin 21 to the arm 2. The extension 16 does not extend vertically, as is apparent from FIG. 2, and due to its own weight it automatically turns about a threaded portion of the pin 21 which extends into a threaded bore at the lower end of the extension 16 until a projecting portion 24 of the plate 18 engages a surface 25 of the arm 2, as shown mostly clearly in FIG. 4, so that in this way the angular position of the extension 16 relative to the arm 2 is determined.

The take-up spool is connected in a known way to the shaft 19 which is supported for free rotation by a lever 26, and the shaft 19 is fixedly and coaxially connected with a friction wheel 27. This friction wheel 27 is surrounded by a friction drum 28 which is supported for free rotation by a lever 29. The levers 26 and 29 are carried by a common shaft 30 which is supported for turning movement by the plate 18. The shaft 30 can be supported for free rotation by the plate 18 and only one of the levers 26 and 29 is fixed to shaft 30 while the other of the levers is freely turnable relative thereto. Thus, while the levers 26 and 29 have a common axis of rotation relative to the plate 18, these levers are capable of freely turning one relative to the other.

The intermediate wheel 20 is in the form of a friction wheel and carries at its periphery a covering 31 of a suitable friction material. The intermediate friction wheel 20 is supported for free rotation by a lever 33 which is in turn supported by a shaft 32, which is carried by the plate 18, for free turning movement relative to the plate 18. The drive means for the shaft 4 which supports the take-up spool 6 of normal size includes the rotary friction drum 10 which normally engages the periphery of the wheel 9 which is surrounded by the drum 10. This drum 10, as shown in FIG. 3, is driven from a belt 34 which surrounds a pulley 47 which is fixed to the shaft 46 which carries the drum 10, this latter shaft being supported for rotary movement by the arm 2.

The friction drum 10 thus forms a rotary member of the drive means which normally drives the shaft 4, and this rotary member 10 of this drive means is in frictional engagement with the intermediate wheel 20 when the extension 16 is attached to the arm 2, and the intermediate friction wheel 20 is also in frictional engagement with the rotary drum 28 which surrounds the friction wheel 27, so that through the intermediate wheel 20, the drum 28, and the friction wheel 27 there is provided a friction transmission means which transmits the drive from the rotary member 10 of the drive means for the shaft 4 to the shaft 19. The structure which drives the belt 34 is conventional and since it forms no part of the invention is not illustrated.

A spring means 35 is connected at one end to a pin 36 which is fixed to the lever 26 and at its opposite end to a pin 37 which is fixed to the plate 18, so that this spring means 35 serves to maintain a certain minimum frictional engagement between the components of the friction transmission to guarantee that there is at least a constant spring-pressed engagement between the friction drum 28, the intermediate wheel 20, and the drum 10.

A limiting means is provided for limiting the extent of turning of the levers 29 and 33 relative to the plate 18, and this limiting means includes pins 38 and 39 respectively carried by the levers 29 and 33 and respectively extending into elongated grooves or slots 40 and 41 formed in the plate 18 so that in this way the extent of turning of the levers 29 and 33 will be limited by engagement of the pins 38 and 39 with the ends of the slots 40 and 41, respectively.

As is apparent from the drawings, the weight of the take-up spool 14 and of course the film carried thereby, will act to urge the lever 26 downwardly so that this weight acts to press the friction wheel 27 against the inner periphery of the drum 28 as well as to press the drum 28 against the wheel 20 and the wheel 20 against the wheel 10, so that as the diameter of the film wound onto the take-up spool 14 increases, the pressure between the friction components of the transmission also increases, and thus a proper frictional drive for the take-up spool is automatically maintained.

As may be seen from FIG. 2, the extension 17, which may be fixed to the arm 3 in the same way that the extension 16 is fixed to the arm 2, carries a friction drum 42 which in this case is fixed to the extension 17. A shaft 43 carries the supply spool 15 which is larger than the supply spool 7, and this shaft 43 is fixed with a friction wheel 44 which is surrounded by and engages the inner periphery of the friction drum 42. The shaft 43 is supported for free rotation by a lever 45 which is in turn supported for free turning movement by the extension 17. Since the friction wheel 44 which is fixed to the spool shaft 43 presses against the inner periphery of the stationary friction drum 42 with a force determined by the weight of the film carried by the supply spool 15, the components 44 and 42 form a brake means retarding the rotation of the supply spool 15 with a force determined by the weight of the film thereon, so that this braking force will be relatively small for a small amount of film on the spool 15 and relatively great for a large amount of film on the spool 15, and in this way a uniform tension is automatically maintained in the film during its movement from the supply spool 15 to the projector. There is no drive provided for the spool shaft 43 from the drive which is normally provided for the shaft 5, since when using the projector with larger spools 14 and 15 the projector mechanism itself is not for rewinding the film from the take-up spool back onto the supply spool. Further, if desired, it is of course possible to drive the spool shaft 43 with a transmission from the drive means for the shaft 5 in the same way that the spool shaft 19 is driven with the above-described transmission from the drive provided for the shaft 4. Thus, the shaft 43 would be driven in the same way that the shaft 19 is driven.

Instead of providing a friction transmission between the drums 10 and 28 as described above and shown in the drawings, it is also possible to use a gear transmission. For example, the friction drums 10 and 28 can be provided with exterior teeth and the intermediate wheel 20 can be replaced by an intermediate gear which transmits the rotation from the teeth provided on the exterior of the drum 10 to the teeth provided on the exterior of the drum 28. In this case, the drum 28 and the wheel 20 would be supported for rotation by suitable shafts directly carried by the plate 18. Furthermore, the transmission can be provided through suitable belt and pulley or sprocket chain and sprocket wheel drives.

It will be understood that each of the elements described above, or two or more together, may also find a useful application in other types of projectors differing from the types described above.

While the invention has been illustrated and described as embodied in motion picture projectors, it is not intended to be limited to the details shown, since various modifications and structural changes may be made without departing in any way from the spirit of the present invention.

Without further analysis, the foregoing will so fully reveal the gist of the present invention that others can, by applying current knowledge readily adapt it for various applications without omitting features that from the standpoint of prior art, fairly constitutes essential characteristics of the generic or specific aspects of this invention and, therefore, such adaptations should and are intended to be comprehended within the meaning and range of equivalence of the following claims.

What is claimed as new and desired to be secured by Letters Patent is:

1. In a motion picture projector, in combination, a first support; a first rotary shaft rotatably mounted on said first support and adapted to carry a first take-up spool on which a film is wound; drive means for driving said first rotary shaft; and adapter unit including a second support and a second rotary shaft rotatably carried by said second support and adapted to carry a second take-up spool of a diameter greater than said first spool so that said second spool can carry more film than said first spool; and friction transmission means arranged on said second support and connecting said drive means to said second shaft for rotatinig the latter and said second spool therewith in such a manner that the force transmitted by said transmission means is determined by the weight of the film wound on said second spool.

2. In a motion picture projector, in combination, drive means for driving a rotary first shaft which is adapted to carry a first take-up spool on which film is wound, said drive means including a rotary member; a second rotary shaft adapted to carry a second take-up spool larger than said first spool so that said second spool can accommodate more film than said first spool; a friction wheel fixed to said second shaft; a friction drum surrounding said friction wheel and engaged by the periphery thereof; a plate; a lever supporting said friction drum for free rotation and turnably carried by said plate; an intermediate friction wheel located between and engaging said rotary member of said drive means and the exterior of said drum for transmitting a drive from said drive means to said drum to rotate the latter and thus rotate said friction wheeel which is fixed to said second shaft; and means mounting said second shaft for free movement toward the inner periphery of said drum with a force determined by the weight of film wound on the second spool, so that said drum will be pressed against said intermediate friction wheel with a force also determined by the weight of the film carried by said second spool.

3. In a motion picture projector, in combination, drive means for driving a first rotary shaft which is adapted to carry a first take-up spool onto which film is adapted to be wound, said drive means including a rotary member; a plate; a pair of lever means located adjacent each other and carried by said plate for free turning movement relative thereto; a second rotary shaft supported for free turning movement by one of said lever means and adapted to carry a second spool of a diameter greater than said first spool for accommodating more film than said first spool; a friction wheel fixed to said second shaft; a friction drum carried for free rotation by the other of said levers and surrounding said friction wheel and engaged by the periphery thereof; an intermediate friction wheel engaging said rotary member of said drive means and said drum for transmitting rotation of said rotary member to said drum to rotate the latter and thus rotate said friction wheel which is fixed to said second shaft so as to turn the latter and a second take-up spool carried thereby; and spring means operatively connected to said lever which carries said second shaft for urging the latter and said friction wheel connected thereto in a direction placing said latter friction wheel in engagement with the inner periphery of said drum, so that said drum also is placed by said spring means in engagement with said intermediate wheel, the weight of the film carried by said second spool also acting to press said friction wheels and drum against each other.

4. In a projector as recited in claim 3, a third lever turnably carried by said plate and supporting said intermediate friction wheel for free rotation.

5. In a projector as recited in claim 4, a pair of limiting means operatively connected to said levers which carry said drum and said intermediate friction wheel, respectively, for respectively limiting the extent of turning of said latter levers with respect to said plate.

6. In a motion picture projector, in combination, drive means for driving a first shaft which is adapted to carry a first take-up spool; support means for supporting for rotation a second shaft which is adapted to carry a second take-up spool larger than said first spool for accommodating a greater amount of film; transmission means transmitting a drive from said drive means to said second shaft; second support means for supporting for rotation a third shaft which is adapted to carry a supply spool of a diameter larger than a supply spool which is adapted to be carried by a fourth rotary shaft; and brake means operatively connected to said third shaft for braking the rotation thereof with a force determined by the amount of film on a supply spool carried by said third shaft.

7. In a motion picture projector, in combination, drive means for driving a first shaft which is adapted to carry a first take-up spool; a second shaft adapted to carry a second spool larger than said first spool; a transmission transmitting a drive from said drive means to said second shaft; support means; a lever connected to said support means for free turning movement relative thereto; a third shaft carried for free rotation by said lever and adapted to carry a third spool, said spool being a supply spool greater than a supply spool which is normally carried by said projector; a friction wheel fixed to said third shaft for rotation therewith; and a friction drum carried by said support means and surrounding said friction wheel to be engaged by the latter with a force determined by the weight of film on the supply spool carried by said third shaft, so that said friction wheel and drum act as a brake for retarding the movement of film from the supply spool carried by said third shaft.

8. In a projector as recited in claim 7, said support means being formed by a plate which is removably connected with the projector.

9. In a projector as recited in claim 8, said projector having an arm which normally carries the shaft which supports the normal supply spool, and said plate forming an extension of said arm.

10. In a motion picture projector, in combination, a pair of stationary arms; a pair of extension plates respectively removably connected with and extending from said arms; a pair of spool-carrying shafts operatively connected to said extension plates for rotation relative thereto; drive means extending along one of said arms; friction transmission means transmitting a drive from said drive means to the shaft carried by the extension plate which is removably connected with said one arm; and a brake means operatively connected to the shaft which is carried by the other of the extension plates.

11. In a motion picture projector, according to claim 1, said transmission means including a plurality of friction wheels.

12. In a motion picture projector according to claim 1, said second support consisting of a plate carrying said transmission means.

13. In a motion picture projector according to claim 1, said second support consisting of a plate carrying said transmission means and said transmission means including friction wheels which engage each other and which are pressed against each other by the weight of the film wound on said second spool.

14. In a motion picture projector according to claim 1, said first support including an arm extending from said housing.

15. In a motion picture projector according to claim 1, said friction transmission means including a plurality of friction wheels which engage each other, said friction transmission means applying the weight of film wound on said second spool to said friction wheels for pressing the latter against each other with a force determined by the weight of the film wound on said second spool, and said friction transmission means also including a friction wheel fixed directly to said second shaft and a friction drum surrounding and having an inner surface engaged by the periphery of said friction wheel which is fixed to said second shaft.

References Cited by the Examiner
UNITED STATES PATENTS 2,501,055  3/1950  Hume _____ 242—55.11
2,531,558  11/1950  Debrie _____ 242—55.14 X FRANK J. COHEN, *Primary Examiner.*

LEONARD D. CHRISTIAN, *Examiner.*